(12) United States Patent  (10) Patent No.: US 7,373,040 B2
Cai et al. (45) Date of Patent: *May 13, 2008

(54) OPTICAL TRANSMISSION SYSTEM INCLUDING DISPERSION SLOPE COMPENSATION

(75) Inventors: Jin-Xing Cai, Morganville, NJ (US); Dmitri Foursa, Freehold, NJ (US); Carl R. Davidson, Warren, NJ (US); Alexei N. Pilipetskii, Colts Neck, NJ (US); Morten Nissov, Ocean, NJ (US); Neal S. Bergano, Lincroft, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/734,987

(22) Filed: Apr. 13, 2007

(65) Prior Publication Data

US 2007/0183787 A1  Aug. 9, 2007

Related U.S. Application Data

(63) Continuation of application No. 11/363,511, filed on Feb. 27, 2006.

(60) Provisional application No. 60/657,125, filed on Feb. 28, 2005.

(51) Int. Cl.
*G02B 6/28* (2006.01)
(52) U.S. Cl. .............................. 385/24; 385/15; 398/58
(58) Field of Classification Search .................. 385/15, 385/24
See application file for complete search history.

(56) References Cited

U.S. PATENT DOCUMENTS 6,324,317 B1 * 11/2001 Tanaka et al. ................ 385/24
7,082,234 B2 * 7/2006 Lee et al. ..................... 385/24

* cited by examiner

*Primary Examiner*—Jennifer Doan
(74) *Attorney, Agent, or Firm*—Grossman, Tucker, Perreault & Pfleger, PLLC

(57) ABSTRACT

A WDM optical transmission system and method uses slope compensation at the transmit terminal and/or the receive terminal. The system and method may be used with modulation formats with a short pulse width and a broad optical spectrum.

6 Claims, 6 Drawing Sheets

OPTICAL TRANSMISSION SYSTEM INCLUDING DISPERSION SLOPE COMPENSATION

CROSS-REFERENCE TO RELATED APPLICATIONS

The present application is a continuation of U.S. patent application Ser. No. 11/363,511, filed Feb. 27, 2006, and claims the benefit of the filing date of U.S. Provisional Application Ser. No. 60/657,125, filed Feb. 28, 2005, the teachings of which applications are fully incorporated herein by reference.

FIELD

The invention relates to the optical transmission of information and more particularly, to an optical transmission system including dispersion slope compensation.

BACKGROUND

The availability of high performance optical amplifiers such as the Erbium-Doped Fiber-Amplifier (EDFA) has facilitated continued development of wavelength division multiplexing (WDM) for optical transmission systems. In a WDM transmission system, two or more optical data carrying channels are combined onto a common path for transmission to a remote receiver. In a long-haul optical fiber system, the set of wavelength channels may be amplified simultaneously in an optical amplifier based repeater. The EDFA is particularly useful in this application because of its ability to amplify multiple wavelength channels with little or no crosstalk penalty.

In general, it is advantageous to operate long-haul transmission systems at a high data rate per channel. Long-haul systems may operate, for example at Synchronous Digital Hierarchy (SDH) standards up to 40 Gb/s or more. As the bit rates rise through the gigabit per second range, there is the need for an increase in the optical powers launched into the transmission fiber, e.g. to 1 mW per channel or more. As demonstrated by Cai et al. ("RZ-DPSK field trial over 13,100 km of installed non-slope-matched submarine fibers", Journal of Lightwave Technology in Vol. 23, No. 1, January 2005 pp. 95-103), variants of the return-to-zero (RZ) modulation format are particularly useful for transmitting large amounts of data over optically amplified fiber paths.

For long distance operation at higher data rates (e.g., 40 Gb/s RZ-DPSK channels), however, there is a need to control chromatic dispersion and the dispersion slope to ensure low dispersion penalties. Dispersion shifted optical fibers have been the preferred transmission medium where there is a need to control chromatic dispersion. The combination of long distance transmission, low dispersion and high channel power may result in crosstalk, or mixing of channels through the slight nonlinearity in the transmission fiber. The transmission of many WDM channels over transoceanic distances can be limited by the nonlinear interactions between channels, which in turn is affected by the amount of dispersion. This subject was reviewed by Tkach et al. (Journal of Lightwave Technology in Vol. 13, No. 5, May 1995 pp. 841-849).

One solution to the problem of nonlinear interactions between channels is known as "dispersion mapping" where the generation of mixing products is reduced by offsetting the zero dispersion wavelength in the transmission fiber from the operating wavelengths of the transmitter. In this established technique, several amplifier sections may have dispersion shifted fiber spans with either positive or negative dispersion. The dispersion accumulates over many amplifier spans, for example, for distances of 500 to 1000 km, and the accumulated dispersion is followed by fiber with the opposite dispersion to bring the average dispersion (as averaged over the length of the cable) back to zero. One problem with this scheme is that conventional dispersion maps only compensate for the dispersion of the transmission fiber over a limited bandwidth (or a sub-set of WDM channels) while allowing the dispersion to accumulate to large values for the majority of WDM channels. To mitigate this problem, additional dispersion compensation using dispersion compensating fibers at the terminals (e.g., the transmitter and/or receiver) may be applied either before the channels are multiplexed at the transmitter, or after the channels are demuliplexed at the receiver. However, this method of dispersion compensation generally does not compensate for accumulation of dispersion slope within the optical bandwidth of a data channel.

Using these conventional dispersion management schemes, the long-haul transmission of 40 Gb/s channels suffers from dispersion-slope penalty. High speed optical data channels may require high channel power for good optical signal to noise ratio (SNR). As is well known, long optical transmission systems that suffer from optical fiber nonlinearities work better with a narrow pulse transmission format, such as RZ, CRZ, and RZ-DPSK. Unfortunately, narrow optical pulses have a wide optical spectrum. Dispersion slope causes the dispersion to change over the bandwidth of the signal having spectrally-broad pulses, which causes signal distortion and limits the ability to increase the bit rate per channel of such systems.

One method of improving 40 Gb/s operation is to use transmission fibers known as "dispersion-flattened" fibers. Unfortunately, the vast majority of existing systems that were designed to work at lower bit rates use conventional fiber that has high accumulated dispersion slope. Thus, there is a need for systems and methods to improve the performance of high-speed signals, for example, when used with conventional dispersion maps.

BRIEF DESCRIPTION OF THE DRAWING

Features and advantages of embodiments of the claimed subject matter will become apparent as the following Detailed Description proceeds, and upon reference to the Drawings, where like numerals depict like parts, and in which:

DETAILED DESCRIPTION

For simplicity and ease of explanation, various exemplary embodiments will be described herein. It is to be understood, however, that the embodiments described herein are presented by way of illustration, not of limitation.

Figure 1:
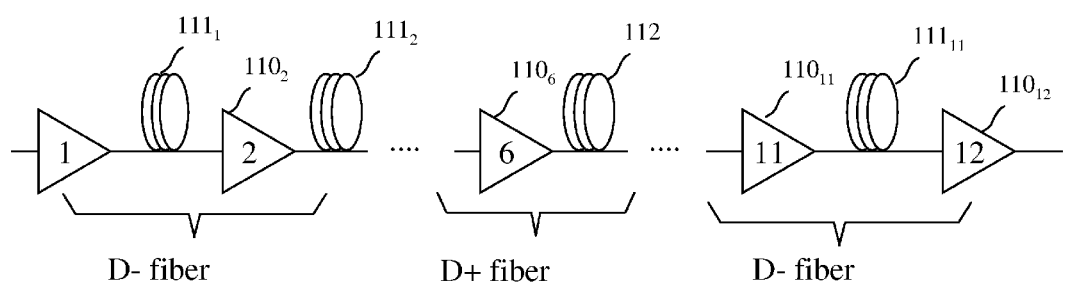
FIG. 1 shows a simplified block diagram of a segment of an exemplary optical transmission path useful in connection with the present invention.

FIG. 1 shows an example of a 500 km segment of an optical transmission path including optical amplifiers $110_N$ concatenated with sections of dispersion fiber 111, 112 so that the end-to-end accumulated dispersion is relatively small, while maintaining a large local dispersion. For a high performance long haul system, it is desirable to have large local dispersion (e.g., to reduce nonlinear mixing) and low end-to-end dispersion (e.g., for high signal fidelity). These two characteristics may be satisfied by using a "dispersion managed" amplifier cable (also known as a "dispersion map"). One example of a dispersion map is a non-zero dispersion shifted fiber (NZ-DSF) dispersion map. In a dispersion managed cable, two different types of fiber may be used with opposite signs of dispersion. In this example, the negative dispersion fibers $111_N$ have a mean dispersion of −2 ps/km-nm and the positive dispersion fibers 112 have a mean dispersion of +17 ps/km-nm. The lengths of the two fiber types may be selected to be in proportion to the ratio of dispersion values.

Figure 1A:
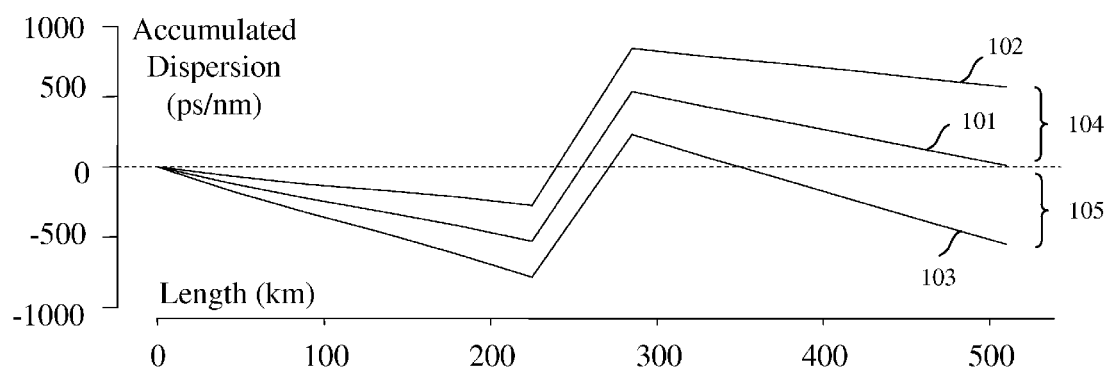
FIG. 1a shows a plot of accumulated chromatic dispersion associated with optical transmission path segment illustrated in FIG. 1.

The accumulated dispersions for three exemplary channels are shown in FIG. 1a as curves 101, 102, and 103. For this arrangement, the chromatic dispersion first accumulates negative dispersion, then positive dispersion, and eventually returns to zero at the end of the dispersion period. In some types of fibers, the characteristic of returning to zero (for accumulated dispersion) for curve 101 is only true for the channel located at the mean zero dispersion wavelength. The curve 102 shows that a higher wavelength channel may accumulate a net positive dispersion as indicated by 104 and the curve 103 shows that a lower wavelength channel may accumulate a net negative dispersion as indicated by 105.

Figure 2:
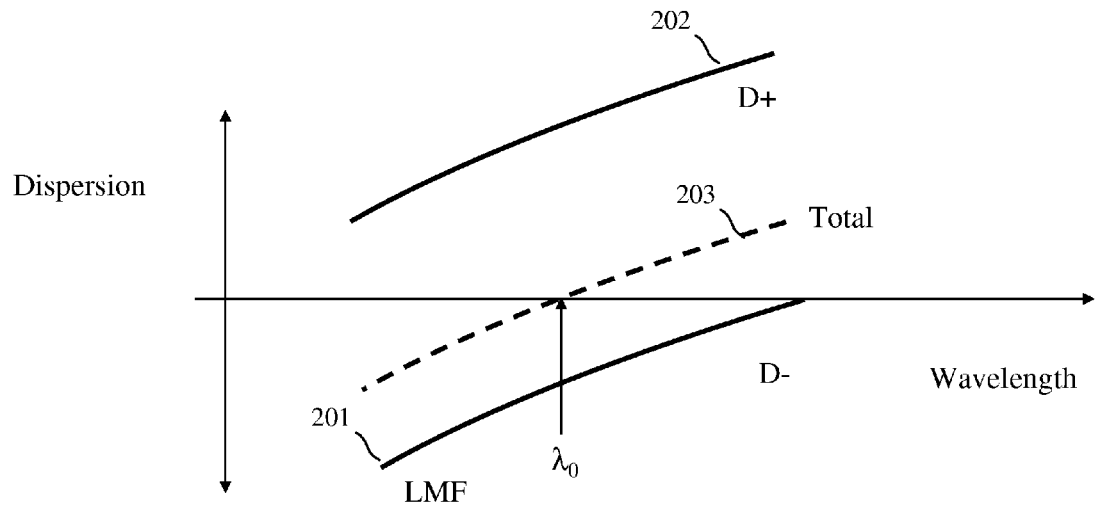
FIG. 2 shows a plot of the chromatic dispersion vs. wavelength over the entire length of an optical transmission system.

This characteristic, known as dispersion slope, is illustrated in plot of dispersion vs. wavelength for each fiber type shown in FIG. 2. Curve 201 shows the dispersion vs. wavelength for the negative dispersion fibers $111_N$, curve 202 shows the dispersion vs. wavelength for the positive dispersion fibers 112, and curve 203 shows the dispersion vs. wavelength characteristic for the entire span. Even for the point at which the accumulated dispersion is zero (indicated as $\lambda_0$ in the figure) for curve 203, there is still a large dispersion slope, which is a consequence of both fiber types having a positive dispersion slope. This linear change in dispersion may be approximated by the equation (1):

$$D = SL(\lambda_{sig} - \lambda_0) \quad (1)$$

where $\lambda_{sig}$ is the signal wavelength (the independent variable in the FIG. 2), $\lambda_0$ is the fiber's zero dispersion wavelength, S is the dispersion slope of the fiber typically stated in units of ps/km-nm$^2$, and L is the fiber's length. Given this linear approximation to the fiber's dispersion, the change in group delay ($\Delta\tau$) as a function of wavelength may be approximated by equation (2), which gives the well-known parabolic shape:

$$\Delta\tau = \frac{SL}{2}(\lambda_{sig} - \lambda_0)^2 \quad (2)$$

Figure 3:
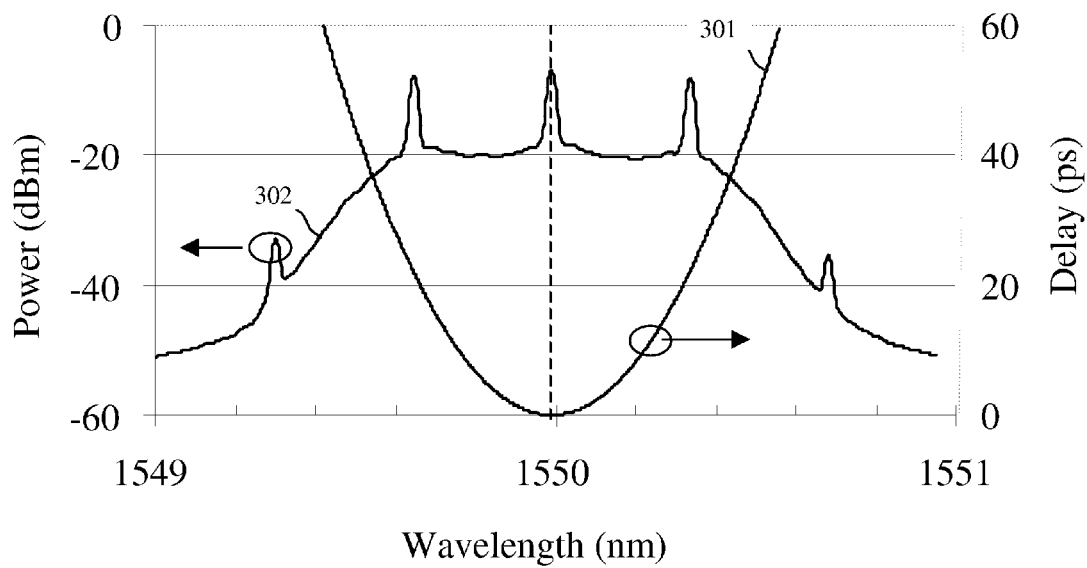
FIG. 3 shows a plot of the group delay vs. wavelength for a system as shown in FIG. 1, along with the optical spectrum of the transmitted signal.

In FIG. 3, group delay curve 301 represents equation (2) calculated for a 6,250 km span of transmission fiber with a dispersion map similar to FIG. 1. The values used in the equation to produce the curve 301 are S=0.075 ps/km-nm$^2$, L=6,250 km, and $\lambda_0$=1550 nm. Curve 302 represents an optical spectrum for a 43 Gb/s optical RZ optical signal, for a carrier to side-band ratio of 0 dB, where the pulse width is about 6.7 psec. The exemplary curves 301, 302 show that the group delay changes by a large fraction of the bit period over the optical spectrum of the data signal. The bit time of the 43 GB/s data signal is about 23.3 psec. Thus, a data signal having a spectrum represented by curve 302 would suffer large penalty if transmitted through that amount of dispersion slope.

Figure 4:
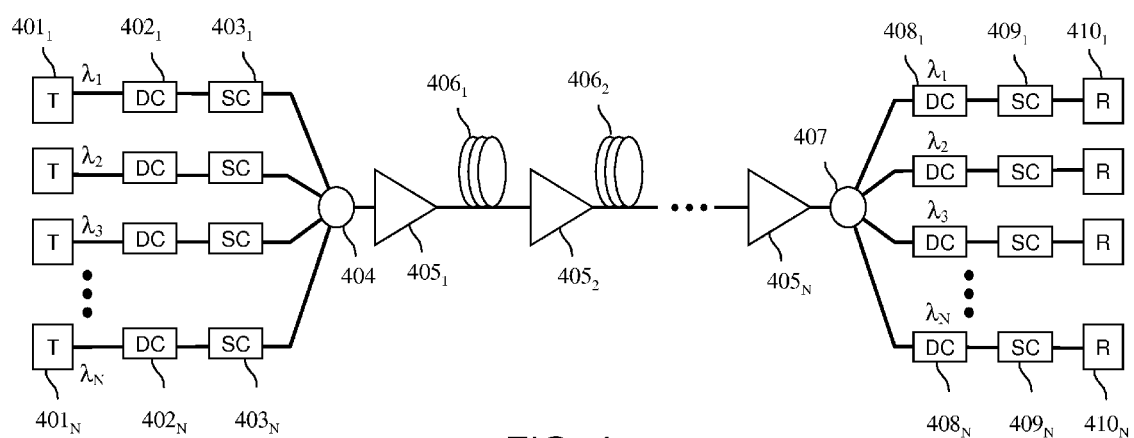
FIG. 4 shows a simplified block diagram of one exemplary embodiment of a WDM transmission system, consistent with the present invention, which has a dispersion slope compensator located in each channel path.

FIG. 4 shows a simplified block diagram of an exemplary WDM optical transmission system, consistent with one embodiment of the invention. As shown, the optical transmission system includes a plurality of transmitters $401_1$-$401_N$ for generating WDM optical signals at associated channels to be transmitted over an optical path to remote receivers. The transmitters $401_1$-$401_N$ can be of several known types in the art including, for example, RZ, CRZ, and/or RZ-DPSK transmitters. The output of transmitters $401_1$-$401_N$ may be optically connected to dispersion compensating units or dispersion compensators $402_1$-$402_N$ and then to dispersion slope compensating units or slope compensators $403_1$-$403_N$. The expressions "optically connected" and "optically coupled" as used herein refer to any connection, coupling, link or the like by which optical signals carried by one optical system element are imparted to the "connected" or "coupled" element. Such "optically connected" or "optically coupled" devices are not necessarily directly connected to one another and may be separated by intermediate optical components or devices. Likewise, the terms "connected" or "coupled" as used herein in regard to physical connections or couplings is a relative term and does not require a direct physical connection.

The plurality of WDM channels may be multiplexed onto a common optical fiber by coupler 404. The coupler 404 may be, for example, a simple N×N directional coupler or a wavelength router device. The plurality of WDM channels are then transmitted over the optical path including optical amplifiers $405_1$-$405_N$ and optical fiber sections $406_1$-$406_N$. In the exemplary embodiment, this optical path may be similar in design to that shown in FIG. 1. Alternatively, the amplifier stages may be based on Raman amplification and/or a combination of EDFA and Raman amplifiers. The fiber spans used in this exemplary transmission system may be non-slope matched, as shown in FIG. 1, or may include dispersion flattened fiber spans, or combinations of both types.

At the receiver end, the optical transmission system may include a coupler 407 for de-multiplexing WDM channels onto separate paths. The receiver end of the optical transmission system may also include a plurality of dispersion compensators $408_1$-$408_N$, dispersion slope compensators $409_1$-$409_N$ and receivers $410_1$-$410_N$. The receivers $410_1$-$410_N$ may be balanced receivers such as the type known to those skilled in the art. The dispersion compensators $408_1$-$408_N$ and the dispersion slope compensators $409_1$-$409_N$ may be implemented using techniques known to those skilled in the art, as described in greater detail below.

The illustrated exemplary embodiment of the optical transmission system shown in FIG. 4 includes a combination of dispersion compensators 402 and 408 and dispersion slope compensators 403 and 409 located at both the transmit and receive terminals. It can be appreciated by those skilled in the art that it may be more cost effective to locate one type (or both types) of such compensators at only one end of the system. For example, another embodiment of the transmission system may include dispersion compensators $402_1$-$402_N$ at the transmit end, dispersion compensators $408_1$-$408_N$ at the receive end, and dispersion slope compensators $409_1$-$409_N$ at the receive end only. Those skilled in the art will also appreciate that the order of the dispersion compensator and dispersion slope compensator is interchangeable.

In operation of the system, the amount of dispersion compensation in the dispersion compensators $402_1$-$402_N$ and $408_1$-$408_N$ may be made to compensate substantially for any accumulated dispersion through the system. In FIG. 1, for example, a high-wavelength channel accumulates an amount of dispersion indicated by 104 after about 500 km. Thus, after passing through about 6,000 km (or 12 times the 500 km), the high wavelength channel will accumulate a large amount of dispersion to be substantially compensated by the dispersion compensators.

The amount of dispersion slope compensation in slope compensators $403_1$-$403_N$ and $409_1$-$409_N$ may be made to compensate substantially for any accumulated dispersion slope through the system. The group delay curve 301 in FIG. 3, for example, shows how the group delay changes with wavelength corresponding to an accumulated dispersion slope of about 480 ps/nm$^2$. The combination of slope compensators $403_1$-$403_N$ and $409_1$-$409_N$ may be made to have a group delay characteristic that is substantially equal in magnitude to group delay curve 301, with opposite sign.

The illustrated exemplary embodiment includes the dispersion compensators and dispersion slope compensators as two separate devices. As can be appreciated by those of ordinary skill in the art, dispersion compensation and slope compensation functions may be combined into a common device, as described below and shown, for example, in FIG. 8. In one embodiment, a quadratically chirped fiber grating may be designed to provide both the correct amount of dispersion compensation and dispersion slope compensation.

The illustrated exemplary embodiment includes a separate optical path for each WDM optical channel. As can be appreciated by those skilled in the art, channels may be grouped into sub-bands that may be compensated in common devices. Also, the number of common dispersion compensating devices need not be equal to the number of dispersion slope compensating devices. This is evident from looking at the curves in FIG. 2, where it is observed that the amount of accumulated dispersion shown as curve 203 is substantially different over the wavelength range in interest. However, the amount of dispersion slope (i.e., the slope of curve 203) is nearly the same for all channels. Thus, some channels may use a slope compensator but no dispersion compensator.

According to another embodiment of the transmission system, the dispersion slope compensators may also function as a fine-tuning element for the dispersion compensators, for example, by making the center wavelength of the dispersion slope compensator tunable. By tuning the center wavelength of the dispersion slope compensator off of the center wavelength of the signal, one can obtain a continuous dispersion adjustment, which can be used to optimize the performance of the WDM channels. Adjusting or tuning the center wavelength adjusts the first order dispersion, while keeping the second-order dispersion fixed. The dispersion for a dispersion slope compensator may also be tuned, as stated above, as fine residual dispersion tweaking to match the link residual dispersion. The 40 Gb/s signals are very sensitive to residual dispersion, and the link dispersion could vary over time due to temperature change.

Figure 5:
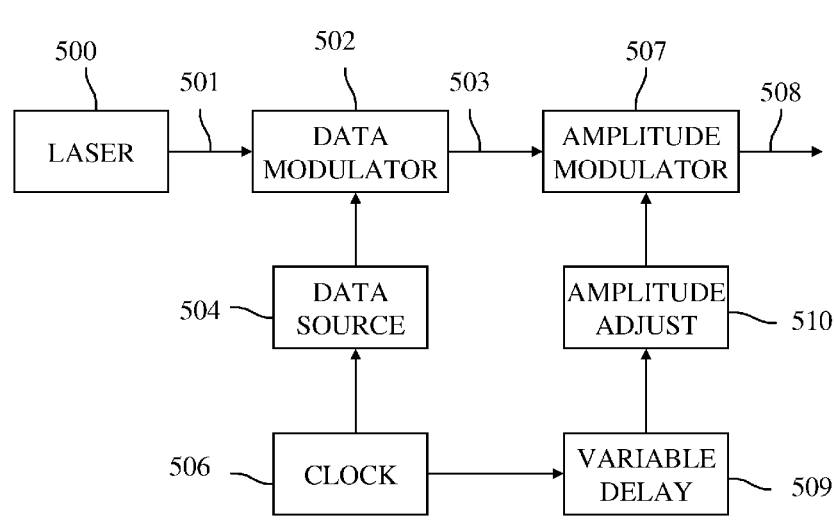
FIG. 5 shows a simplified block diagram of one embodiment of a transmitter that can be used in combination with the dispersion slope-compensated system, consistent with the present invention.

FIG. 5 shows a simplified block diagram of one embodiment of a transmitter that may be used in the transmission system shown in FIG. 4. In the illustrated exemplary embodiment, laser 500 produces a CW light signal on path 501 that connects to data modulator 502. The data modulator 502 may modulate the optical signal to impart information thereto in a well-known fashion. A variety of data modulator configurations for applying a variety of modulation formats are well-known to those of ordinary skill in the art. For example, the data modulator 502 may be configured to modulate the optical signal using a well-known format such as NRZ, RZ, phase shift keying (PSK), differential phase shift keying (DPSK), etc. The method is not limited, however, to a particular modulation format and other formats (e.g., OOK, DBPSK, DQPSK, etc.) may be used. Including the dispersion slope compensator into the optical transmission system may give greater flexibility to optimize the transmission format used in the plurality of transmitters.

In an embodiment wherein the data modulator 502 is configured to modulate the optical signal to impart information thereto using a DPSK format, the data modulator 502 may receive the data to be imparted to the optical signal 501 from a data source 504 and modulate the optical signal 501 at a frequency determined by a clock 506 to form a DPSK modulated signal 503 in a well-known manner. The DPSK modulated optical information signal 503 may be transmitted from the data modulator 502 to an amplitude modulator 507, which places a synchronous intensity modulation on the optical information signal 503.

The intensity modulation imparted by the amplitude modulator 507 may be periodic. To impart periodic amplitude modulation, the modulator 507 may be driven by a periodic signal, such as a sinusoidal or square wave signal. In one embodiment, the amplitude modulator 507 may be configured to impart amplitude modulation without also applying phase modulation to the signal. The amplitude modulator 507 may thus re-modulate the DPSK modulated signal 503 at a rate equal to the rate at which data is imparted to the optical signal 501 as defined by clock source 506 generating a sinusoidal signal. One example of intensity modulation imparted by an amplitude modulator on a DPSK modulated optical signal is described in greater detail in U.S. Pat. No. 6,556,326 and pending U.S. patent application Ser. No. 10/780,830, which is fully incorporated herein by reference.

The DPSK data modulator 502 in such an embodiment may include a Mach-Zehnder-type optical modulator as described, for example, in T. Chikama, et al., "Modulation and Demodulation Techniques in Optical Heterodyne PSK Transmission Systems," Journal of Lightwave Technology, Vol. 8, No. 3, March 1990 pages 309-322, the teachings of which are hereby incorporated by reference. In such a configuration, the optical phase of the DPSK modulated signal 503 emerging from the data modulator changes abruptly from 0° to 180° (or 0 to π radians) on the transitions between differential bits, thus providing a high-fidelity digital phase modulation.

In an embodiment where the data modulator 502 is a DPSK modulator, it may also be advantageous to provide an electrical variable-delay 509 and an amplitude adjustment 510. The variable delay 509 may be used to selectively adjust the phase of the amplitude modulation imparted by amplitude modulator 507 relative to the phase of the data modulation imparted by data modulator 502. The amplitude adjustment 510 may be used to set the depth of modulation that amplitude modulator 507 imparts on signal 503. The optimal settings for these adjustments will depend on many parameters in the system, and can be determined empirically. In one embodiment, the delay provided by variable delay 509 may be set to align the center of the data bits on line 503 with the peak amplitude point of the synchronous amplitude modulation provided by amplitude modulator 507. Again, in a WDM system, the optimal setting for each channel may not necessarily be the same and thus the channels may be individually optimized.

Figure 5A:
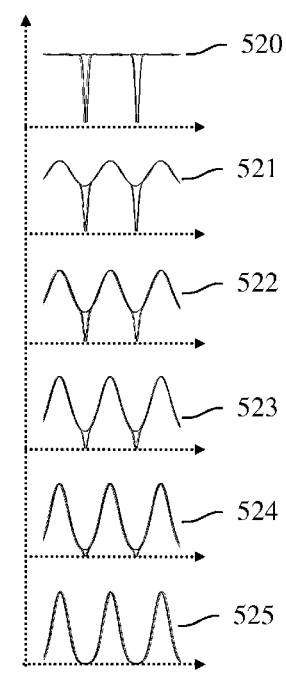
FIG. 5a shows exemplary waveforms output from an exemplary transmitter consistent with the invention using a DPSK modulation format and different levels of amplitude modulation.

Using the combination of the exemplary transmitter shown in FIG. 5 in the exemplary dispersion slope compensated WDM system shown in FIG. 4, it is possible to optimize the transmission performance by adjusting the pulse width of the transmitter. FIG. 5a also shows a series of waveforms 520-525, where each of the illustrated waveforms results from a different level of depth of amplitude modulation imparted by the amplitude modulator 507. The progression of waveforms starting with 520 and going to 525 shows a progressively deeper amplitude modulation and thus a shorter pulse width. Waveform 520 is an example of an intensity profile for a conventional DPSK waveform, and is sometimes referred to as representing Non-Return-to-Zero DPSK (NRZ-DPSK). Waveforms 521, 522, 523, 524, and 525 illustrate amplitude modulation depths of 20%, 40%, 60%, 80%, and 100%, respectively. These different levels of amplitude modulation may, for example, be established by the amplitude adjustment mechanism 510. The optical intensity of waveform 525 returns substantially to zero during contiguous blocks of binary 0's or π's and hence is sometimes referred to as representing Return-to-Zero DSPK (RZ-DPSK).

Figure 6:
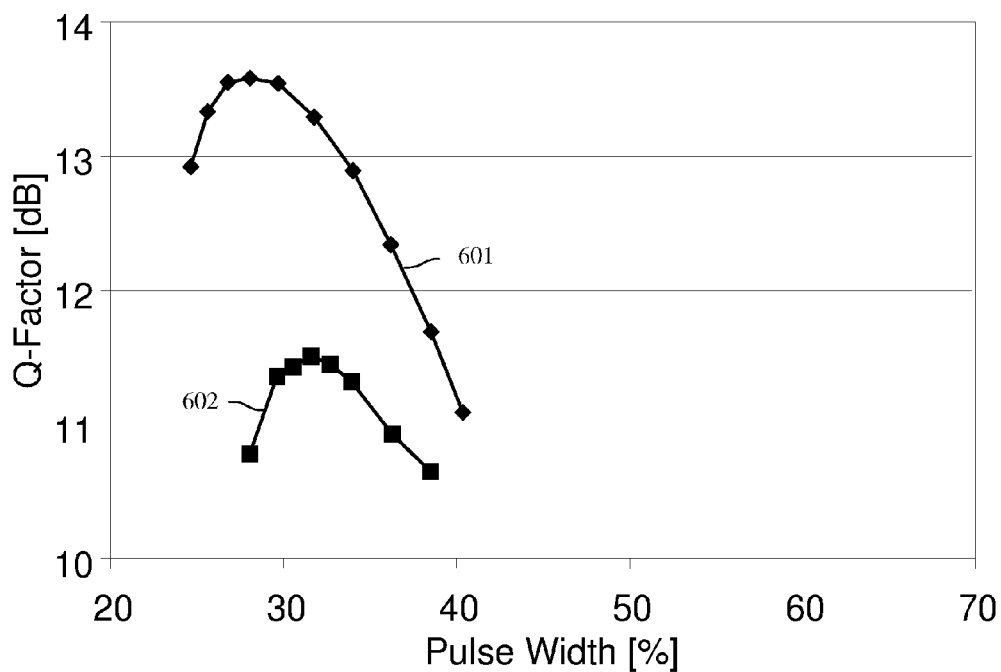
FIG. 6 shows a plot of transmission performance vs. pulse width for a 6,250 km transmission path.

FIG. 6 shows the results of a transmission experiment performed over a distance of 6,250 km using an amplifier chain similar to FIG. 1 and a 43 GB/s RZ-DPSK transmitter similar to FIG. 5. The figure shows the measured Q-factor vs. the pulse width (set at the transmitter) as a percentage of the bit time for the 43 Gb/s pulse for cases with a dispersion slope compensator (curve 601) and without a dispersion slope compensator (curve 602). In the illustrated exemplary embodiment, the pulse width is adjusted between about 25% and about 40% of the bit time associated with the transmitted signals according to the description of FIG. 5.

The curves show a performance advantage for pulse widths between about 25% and about 40% when using a slope compensator at the receive terminal. Also, the curves show that it is possible to operate the systems with a shorter pulse width when using the dispersion slope compensator. In particular, curve 601 shows a maximum a Q-factor of about 13.5 dB for pulse widths between about 27-31% when slope compensation is used, whereas curve 602 shows a maximum Q-factor of about 11.5 dB for pulse widths between about 31-33% when slope compensation is not used. Q factor is maximized at a higher value and at a shorter pulse width when slope compensation is used. In the embodiment illustrated in FIG. 6, for example, at pulse widths below about 31% the Q factor of the non-slope compensated system decreases and the Q factor of the slope compensated system increases. When upgrading an existing system, therefore, performance can be improved by compensating for dispersion slope and reducing the existing pulse width, e.g. to a less than the optimum pulse width in the existing system without slope-compensation. Also, as shown, in a slope-compensated system at pulse widths less than about 40% Q-factor performance remains significantly improved compared to when no slope compensation is used with the same pulse width.

Figure 7:
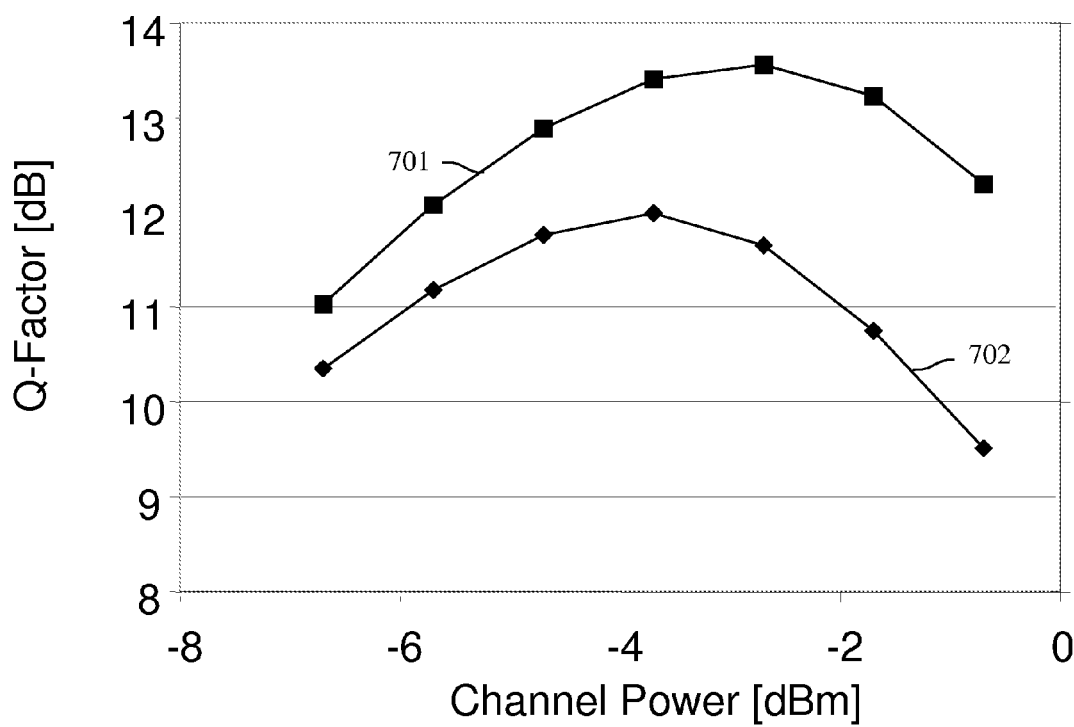
FIG. 7 shows a plot of transmission performance vs. average channel power for a 6,250 km transmission path.

FIG. 7 show the results of a transmission experiment performed over the same distance as in FIG. 6. One experimental transmission is made with a dispersion slope compensator and with the RZ-DPSK modulation format and another experimental transmission is made without a dispersion slope compensator and with the CSRZ-DPSK modulation format. The figure shows the measured Q-factor vs. the average optical channel power expressed in dBm. Curve 701 was measured with the dispersion slope compensation (RZ-DPSK) and curve 702 was measured without the slope compensation (CSRZ-DPSK). According to the experiment, the performance with the dispersion slope compensator is improved at every power level and the addition of the dispersion slope compensator allows the WDM channel to operate at a higher optical power. Also, the ability to operate with narrow pulse widths having higher optical power gives the channel a better received signal-to-noise ratio and leads to improved performance.

Figure 8:
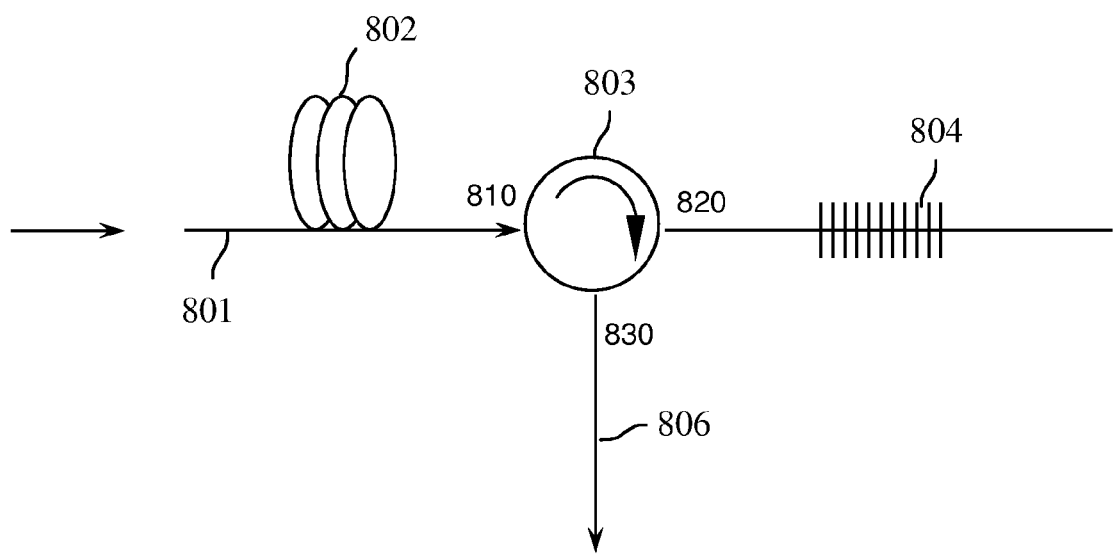
FIG. 8 shows a simplified block diagram of one embodiment of an apparatus that can compensate for both dispersion and dispersion slope.

FIG. 8 shows a simplified block diagram of one embodiment of a compensator that can be used to compensate for both chromatic dispersion and dispersion slope. In operation, this apparatus may serve as both a dispersion compensator 408 and a slope compensator 409 in the receiver section and/or as a dispersion compensator 402 and slope compensator 403 in the transmit section of the transmission system shown in FIG. 4. An input optical signal enters the compensator apparatus on path 801 and then passes into dispersion compensating fiber 802. One example of dispersion compensating fiber 802 is an OFS Rightwave® dispersion compensating module. Next, the signal enters port 810 of an optical circulator 803. The signal emerges from circulator 803 on port 820 and then enters a fiber grating 804, such as a quadratically chirped fiber grating. The signal reflected off of grating 804 enters the circulator 803 back into port 820, and emerges on port 830 of circulator 803 on path 806. In operation, dispersion compensating fiber 802 may be designed to compensate the accumulated dispersion in the optical path including amplifiers 405 and fiber sections 406 (see FIG. 4). The group delay characteristic of a signal reflected off of grating 804 is designed to compensate for the dispersion slope of the optical path described above.

According to another alternative of the compensator shown in FIG. 8, the dispersion compensating fiber 802 may be located between optical circulator 803 and fiber grating 804. By doing this, the required length of dispersion compensating fiber 802 can be shortened by half. According to a further embodiment of the transmission system, the slope compensator may also act as a channel selection filter, similar to the current 3-port channel dropping filter known to those skilled in the art.

A system, apparatus and method is thus provided for dispersion management that yields improved transmission performance for WDM optical transmission systems. According to one aspect of the present invention, a dispersion slope-compensating element or slope compensator is used at the receive terminal and/or at the transmit terminal to compensate for the accumulated dispersion-slope. This allows the narrow optical pulses (i.e., having wide optical bandwidth) to be used at higher optical power levels.

According to another aspect of the present invention, a WDM optical transmission system includes a transmitter configured to provide a plurality of optical signals, each of the optical signals having associated data modulated thereon and having a narrow pulse width (e.g. less than about 40%) of a bit time associated with the data; a receiver; an optical fiber transmission path coupling the transmitter to the receiver, the transmission path establishing a end-to-end dispersion slope across a range of wavelengths transmitted from the transmitter to the receiver; and at least one dispersion slope compensator configured to compensate for at least a portion of the end-to-end dispersion slope, the dispersion slope compensator being positioned at the transmitter or the receiver. The dispersion slope compensator may compensate for slope of at least one channel or block of channels. The slope compensator may also act as a channel selection filter. The optical path may include non-slope-matched fibers and/or dispersion flattened fibers.

According to another aspect of the present invention, a compensating apparatus comprises an input path, a dispersion compensating fiber, an optical circulator, a compensating element, and an output path. The compensating element may be a fiber grating. The dispersion compensating fiber may be located between the input path and the optical circulator or between the optical circulator and the compensating element.

According to yet another aspect of the present invention, a WDM optical transmission system includes a transmitter, a receiver, an optical fiber transmission path coupling the transmitter to the receiver, the transmission path establishing a end-to-end dispersion slope across a range of wavelengths transmitted from the transmitter to the receiver, and at least one dispersion slope compensator configured to compensate for at least a portion of the end-to-end dispersion slope, the dispersion slope compensator being positioned at the transmitter or the receiver. The transmitter may be configured to provide a plurality of optical signals, each of the optical signals having associated data modulated thereon using a DPSK modulation format and having a periodic intensity modulation thereon at an intensity modulation depth equal to about 100% to establish a pulse width less than about 31% of a bit time associated with the data. The transmitter may include an optical signal source configured to generate at least one of the optical signals; a data modulator coupled to the optical signal source and configured to modulate the data on the at least one of the optical signals at a data modulation frequency; and an amplitude modulator coupled to the optical signal source and configured to provide the periodic modulation of the intensity of the at least one of the optical signals. Using a modulation format with a short pulse width or broad optical spectrum together with a slope compensator allows mitigation of nonlinearities and enables operation at higher per channel power especially for systems initially deployed with only a few channels.

According to another aspect of the present invention, a method of transmitting optical signals in a WDM optical transmission system includes compensating for dispersion slope in one or more channels or in a block of channels when transmitting and/or receiving the optical signals. The method may include modulating optical signals using a modulation format with a short pulse width or a broad optical spectrum. The modulation formats may include RZ, CSRZ, CRZ and RZ-DPSK. The short pulse width may be a pulse width less than a pulse width required to achieve a maximum Q-factor in the absence of the compensating step. The method may also include intensity modulating a DPSK modulated signal to produce the optical signal being transmitted. The method may also include adjusting or tuning a center wavelength of the slope compensator(s) to compensate for accumulated dispersion change in a transmission line.

According to a further aspect of the present invention, a method of upgrading a WDM system to increase the bit rate per channel includes adding slope compensation at the transmit terminal and/or the receive terminal and reducing an existing pulse width associated with optical signals transmitted on the system. The pulse width may be reduced to a new pulse width less that required to achieve a maximum Q-factor in the absence of the compensating step. The WDM system to be upgraded may include conventional (non-slope-matched) optical fibers.

The embodiments that have been described herein but some of the several which utilize this invention and are set forth here by way of illustration but not of limitation. Many other embodiments, which will be readily apparent to those skilled in the art, may be made without departing materially from the spirit and scope of the invention.

What is claimed is:

1. A method of improving the performance of an existing wavelength-division multiplexed communication system including a transmitter for transmitting a plurality of optical signals having data modulated thereon with an existing pulse width to a receiver through an optical fiber transmission path, said optical fiber transmission path establishing an end-to-end dispersion slope across said optical signals, said method comprising:
    compensating for at least a portion of said end-to-end dispersion slope at said transmitter or said receiver; and
    reducing said existing pulse width.

2. A method according to claim 1, wherein said reducing said existing pulse width comprises reducing said existing pulse width of at least one of said optical signals to less than about 40% of said bit time associated with said data.

3. A method according to claim 1, wherein said reducing said existing pulse width comprises reducing said existing pulse width of at least one of said optical signals to between about 25% and about 40% of said bit time associated with said data.

4. A method according to claim 1, wherein said reducing said existing pulse width comprises reducing said existing pulse width of at least one of said optical signals to less than about 31% of said bit time associated with said data.

5. A system according to claim 1, wherein said at least one dispersion slope compensator is positioned in said receiver.

6. A method according to claim 1, said method further comprising increasing a power level associated with each of said optical signals.

* * * * *